United States Patent [19]

Day et al.

[11] 4,068,434
[45] Jan. 17, 1978

[54] COMPOSITE WALL PANEL ASSEMBLY AND METHOD OF PRODUCTION

[76] Inventors: Stephen W. Day, 73 W. Alexandersville-Bellbrook Road, Dayton, Ohio 45459; Daniel M. Hutcheson, 3855 Upper Bellbrook Road, Bellbrook, Ohio 45305

[21] Appl. No.: 673,383

[22] Filed: Apr. 5, 1976

[51] Int. Cl.$^2$ .............................................. E04B 5/48
[52] U.S. Cl. .................................. 52/220; 52/309.11; 52/404; 52/615
[58] Field of Search ................ 52/309, 615, 622, 404, 52/220

[56] References Cited

U.S. PATENT DOCUMENTS

| | | | |
|---|---|---|---|
| 3,462,897 | 8/1969 | Weinrott | 52/615 X |
| 3,591,993 | 7/1971 | Reeves | 52/615 X |
| 3,641,724 | 2/1972 | Palmer | 52/615 |
| 3,643,393 | 2/1972 | Pierce et al. | 52/309 X |
| 3,689,681 | 9/1972 | Searer et al. | 52/220 UX |
| 3,736,715 | 6/1973 | Krumwiede | 52/309 |
| 3,785,913 | 1/1974 | Hallamore | 52/309 X |

*Primary Examiner*—Price C. Faw, Jr.
*Assistant Examiner*—Carl D. Friedman
*Attorney, Agent, or Firm*—Jacox & Meckstroth

[57] ABSTRACT

An outer skin or facing of wood sheet material and an inner skin or facing of wood sheet material are adhesively bonded to opposite sides of a core of rigid expanded foam material to form an elongated wall unit having a horizontal length greater than its vertical height. A longitudinally extending upper portion of the wall unit incorporates adhesively bonded members which form an integral continuous beam extending horizontally from one end of the wall unit to the opposite end. The integral beam has a vertical height substantially greater than its thickness for supporting a substantial load above a door or window opening which may be subsequently formed within the wall unit at any selected location between the ends of the wall unit. A plurality of spaced wood furring strips are adhesively bonded to the inner facing of the wall unit and are provided with channels adjacent the inner facing for receiving electrical wiring. The furring strips also function to strengthen the wall unit against wind deflection and provide for an air space between the inner facing and gypsum dry wall sheeting which is subsequently attached to the furring strips. An integral continuous beam may also be located within a lower portion of the unit. In one embodiment, the beam is formed by members which are vertically spaced between the facings to form a box beam, and in another embodiment, the vertically spaced beam members are bonded only to the inner facing to form a "C" shaped continuous beam.

5 Claims, 6 Drawing Figures

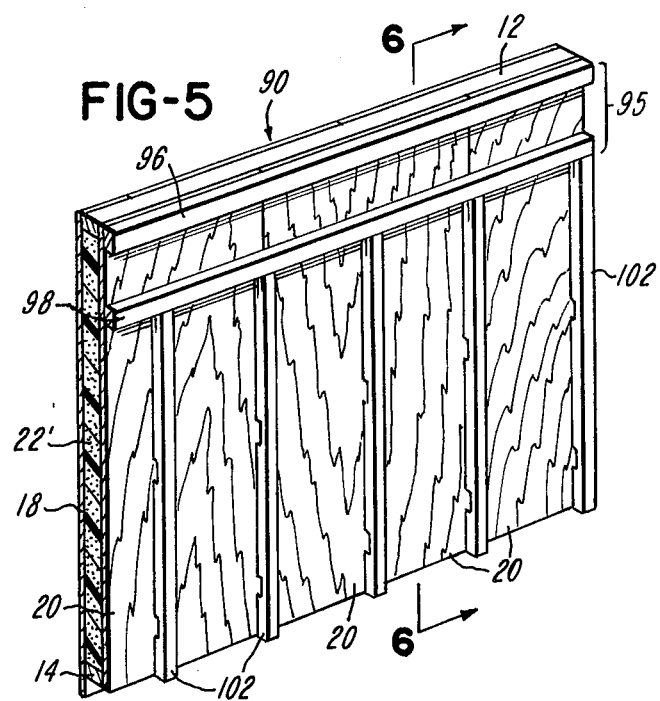
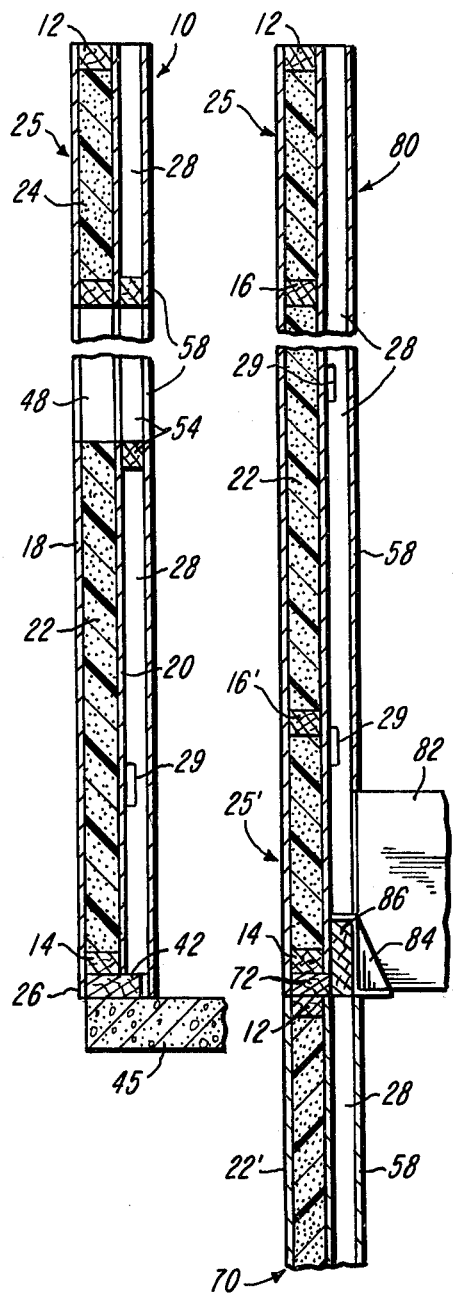
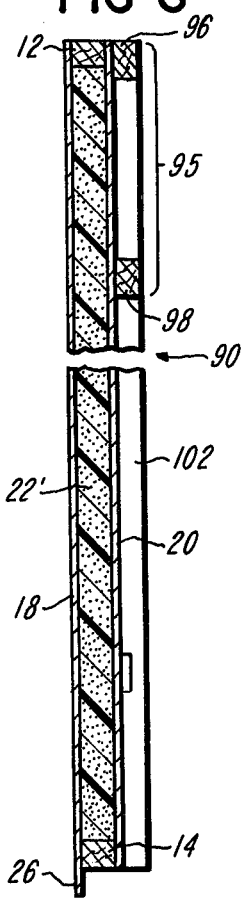

COMPOSITE WALL PANEL ASSEMBLY AND METHOD OF PRODUCTION

BACKGROUND OF THE INVENTION

In the construction of single family and multiple family dwelling or building structures, there have been many different types of building systems either used or proposed in an attempt to provide a more efficient means of construction than the conventional on site "stick built" structure. For example, it is common to construct a structure with the use of panelized exterior walls which are prefabricated in a factory by attaching sheeting such as sheets of composite boards to parallel spaced vertical wood studs extending between a wood top plate and a wood bottom plate. The window and doorway openings are preformed within the panels by constructing a header and surrounding frame for each opening.

Such prefabricated panelized exterior walls are constructed and shipped in predetermined lengths, usually, no greater than 16 feet and either with or without fiber glass insulation between the studs so that each wall panel may be handled and erected manually by an erection crew. Panelized wall structures have also been built with a greater length, and a crane is used at the building site to move and position each building panel which is coded for erection as a predetermined wall of a predesigned building structure. After all the exterior walls are erected and the roof system is constructed along with the framework for the interior walls, the electrical wiring is installed along with fiber glass insulation and plumbing. The inner sheeting of "dry wall" or gypsum board or paneling is then attached to the studs and joist or roof system to complete the exterior and interior walls along with the ceilings.

Building structures have also been constructed with the use of prefabricated "stressed skin" panels which may consist of plywood skins or facings bonded by adhesive to opposite sides of a wood framework including a core of vertical studs extending between top and bottom wood plates and with fiberglass or expanded foam insulation between the studs. The window and door openings are preformed within the panels by means of corresponding wood frames.

Many various types of buildings have been either constructed or proposed for construction of foam core panels wherein rectangular panels of expanded plastics foam material, such as polystyrene or polyurethane, are sandwiched between two facings or skins of sheet material such as metal or plywood. For example, U.S. Pat. No. 3,712,004 discloses a building structure constructed of preformed panels each having an expanded plastics foam core sandwiched between two relatively thick sheets of plywood. The panels are used to construct the floor, ceiling and interior walls of the building in addition to the exterior walls. As illustrated in the patent, the abutting edges of adjacent panels are coupled together by means of a key or spline formed of wood. However, other sandwiched foam core panels with metal or plywood skins have been joined by various other forms of edge connecting means or joint systems.

In the mobile home industry, it has been determined that the floor and walls of a mobile home unit can each be constructed as a one-piece foam core panel extending the full length of the mobile home, for example 50 to 60 feet. In the construction of such wall panels for a mobile home, the window and door openings are preframed with wood members which have the same thickness as the foam core. The foam core panels and the wood frame members are then sandwiched and pressed between an inner skin of decorative prefinished plywood or gypsum board and an outer facing or skin of exterior plywood or aluminum sheeting. The inner and outer skins are laminated to the foam core panels and the wood frame members by a suitable adhesive, and vertical grooves are formed within the foam core panels for inserting or threading the necessary electrical wiring required in the exterior walls of the mobile home.

The high insulation value of expanded plastics foam material, makes the material attractive for use in exterior walls of a dwelling or building structure, especially with the higher cost of energy for heating and air conditioning. However, the cost of prefabricating custom-made wall panels with an expanded plastics foam core sandwiched between inner and outer skins or sheeting is usually higher than conventional panelized wood stud walls. Moreover, if the foam core walls are not pre-wired, considerable time is required to insert electrical wiring within passages or channels formed within the foam core before the skins are attached.

It has also been found that wall panels formed with an expanded foam core laminated between rigid skins, provide somewhat of a drum effect, resulting in a higher transfer of sound through the exterior walls. In addition, it is desirable for a prefabricated foam core exterior wall panel to have a substantially standard overall wall thickness such as the 4½ inch commonly used for stud walls with dry wall sheeting or the 5½ inch thickness which is common for exterior stud walls with plaster interior. These standard wall thicknesses are desirable for accommodating preformed window and door jamb units.

SUMMARY OF THE INVENTION

The present invention is directed to an improved composite wall panel assembly and its method of production, and which, as one important advantage, provides for significantly reducing the cost of constructing a building structure. As another advantage, the wall assembly of the invention provides for using an expanded plastics foam material to obtain high insulation values and to minimize the use of wood members so that there is a minimum of heat transfer through the wall panel assembly. As another important feature, the wall panel assembly of the invention eliminates the need for customizing exterior wall panels by the preforming of window and doorway openings, and thereby provides for obtaining maximum efficiency in the factory production of exterior wall panel assemblies. Furthermore, in a preferred embodiment of the invention, the wall panel assembly is provided with a standard overall wall thickness for accommodating standard window frames and door jambs.

The wall panel assembly of the invention is also adapted to be constructed with a substantial horizontal length and can be conveniently handled as a result of its high strength and low weight ratio relative to conventional exterior wall panels with door studs. The long wall panel assembly further provides the desirable feature of permitting window and doorway openings to be located at substantially any position between the ends of the wall panel, and particularly after the exterior walls of the building structure are erected, thereby providing substantial flexibility for architects, building contractors and building owners. As a result, the wall panels constructed in accordance with the present invention provide for significantly reducing the time for "closing in" or completely enclosing the exterior shell of a building structure, thereby permitting the structure to be heated as soon as possible so that electrical wiring and plumbing installations may commence without delays.

Other features and advantages of a wall panel assembly constructed in accordance with the invention will be apparent from the following description, the accompanying drawings and the appended claims.

BRIEF DESCRIPTION OF THE DRAWINGS

FIG. 3 is a vertical section similar to FIG. 2 and taken generally on the line 3-3 of FIG. 1;

FIG. 4 is a vertical section similar to FIG. 3 and illustrating an exterior wall panel assembly of a two-story building structure and constructed in accordance with the invention;

FIG. 5 is a fragmentary perspective view similar to FIG. 1 and illustrating another embodiment of a wall panel assembly constructed in accordance with the invention; and FIG. 6 is a vertical section similar to FIG. 2 and taken generally on the line 6—6 of the embodiment shown in FIG. 5.

DESCRIPTION OF THE PREFERRED EMBODIMENTS

Figure 1:
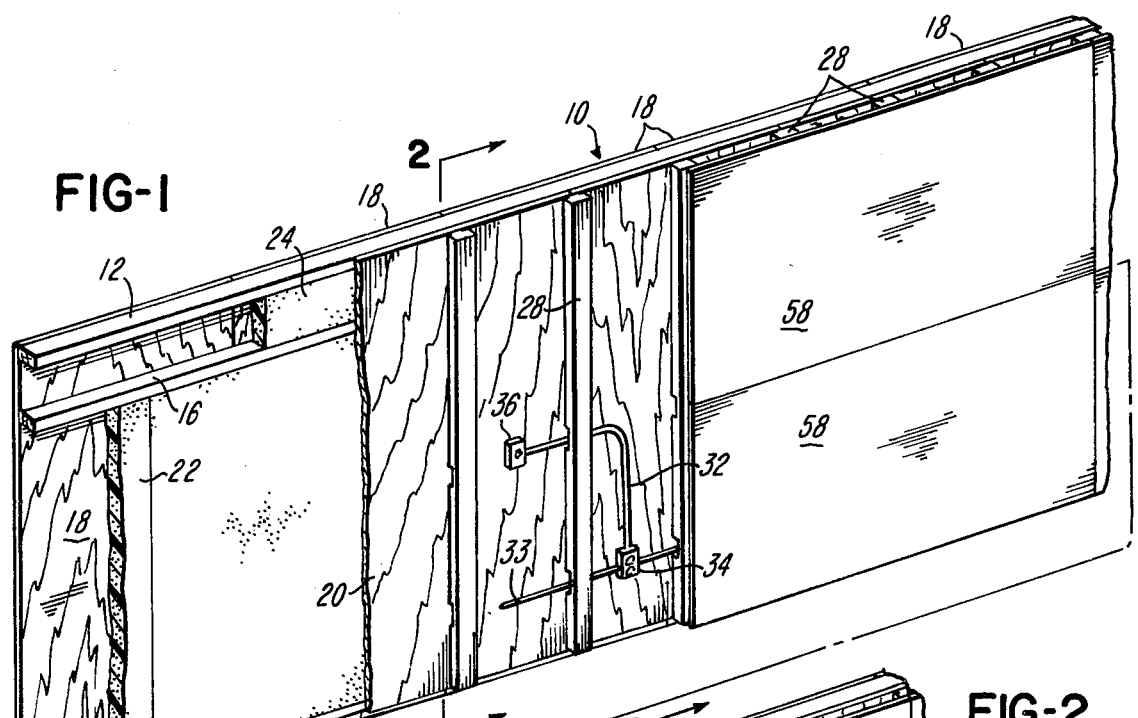
FIG. 1 is a fragmentary perspective view of a composite wall panel assembly constructed in accordance with the invention and with portions broken away to illustrate the internal construction of the assembly.

The unitized composite wall panel assembly 10 shown in FIG. 1 has a horizontal length which is substantially greater than its vertical height. For example, the assembly may have a height of approximately 8 feet and a length from 8 to 50 feet or more. The assembly includes a longitudinally extending horizontal top member or plate 12 and a corresponding bottom member or plate 14 which are preferably constructed of wood.

In order for the members or plates 12 and 14 to be continuous along the full length of the panel assembly 10, the adjacent ends of precut lengths of the plates are rigidly connected, for example, by finger-joints or by metal plates or by other connector means capable of transmitting tensile and compressive loads. Another continuous header member or plate 16 is also formed of wood and extends horizontally below the top plate 12 in parallel spaced relation and along the full length of the panel assembly 10. As illustrated in FIG. 1, the bottom of the header plate 16 is spaced approximately 14 inches below the top plate 12 and approximately 82 inches above the bottom plate 14.

The panel assembly 10 further includes an outer skin or facing 18 and an inner skin or facing 20, and each of the facings 18 and 20 are formed by a series of 4 × 8 foot sheets of wood material such as exterior plywood or compressed wood particle board having a thickness preferably between ¼ and ⅜ inch. As explained later, the outer facing 18 may have a greater thickness if it is used to provide a prefinished exterior surface. A series of panels 22 and 24 of rigid expanded polystyrene plastics foam material is spaced between the outer facing 18 and the inner facing 20, and the panels 22 and 24 cooperate with the top plate 12, the header plate 16 and the bottom plate 14 to form a core for the wall panel assembly 10.

The outer skin or facing 18 and the inner skin or facing 20 are rigidly bonded to the adjacent edge surfaces of the plates 12, 14 and 16 and the outer surfaces of the foam core panels 22 and 24 by a suitable adhesive.

Figure 2:
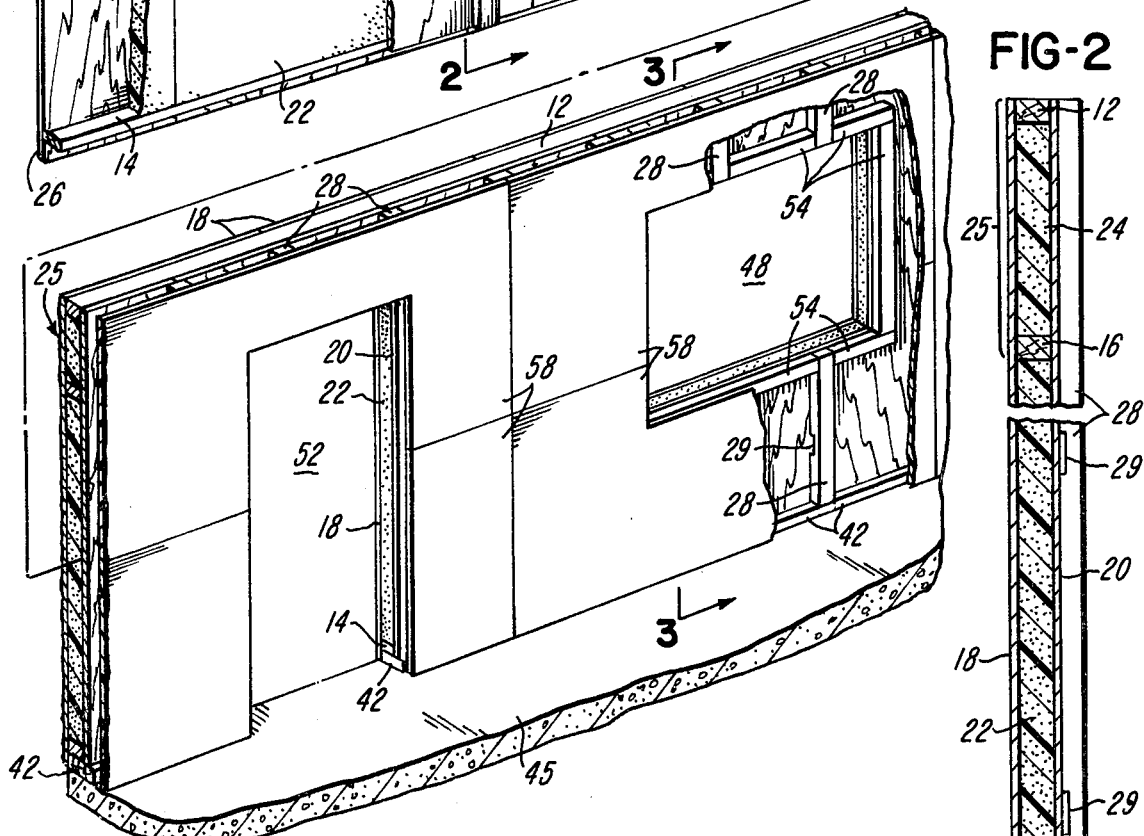
FIG. 2 is a vertical section of the wall panel assembly taken generally on the line 2—2 of FIG. 1.
Figure 2:
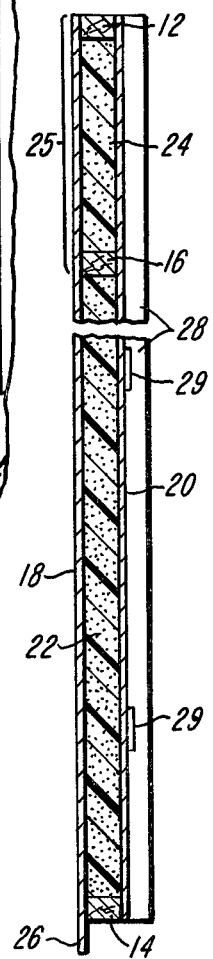

Referring to FIG. 2, the outer facing 18 projects below the bottom plate 14 to form a downwardly projecting continuous outer lip or flange 26. Preferably, the width of the plates 12, 14 and 16 and the thickness of the foam core panels 22 and 24 is approximately two inches. Thus when the inner and outer facings are formed by ¼ inch sheets of compressed wood particle board or plywood, the overall thickness of the laminated core and sheeting assembly is approximately 2½ inches. As apparent in FIG. 3, the top plate 12 and the header plate 16 cooperate with the bonded inner and outer skins or sheets 18 and 20 and the foam core panel 24 to form an integral rigid box beam 25 which extends the full length of the wall panel assembly 10. As shown in FIGS. 1 and 2, the joints formed by the abutting edges of the 4 × 8 foot sheets of the outer facing 18 are staggered or off-set with respect to the joints formed by the abutting edges of the sheets of the inner facing 20 to provide the box beam 25 and the wall panel assembly 10 with a greater strength and resistance to bending.

The wall panel assembly 10 shown in FIGS. 1 and 2, also includes a series of horizontally spaced vertical furring strips 28 which are preferably formed of wood "2 × 2" having an actual width and thickness of 1.5 inch. The furring strips 28 are bonded by adhesive to the sheeting forming the inner facing 20 and are preferably spaced on uniform centers of 24 inches. Thus alternate furring strips 28 overlap the buttting edges of joints of the underlying sheets forming the facing 20 and thereby form a rigid tie or splice between the adjacent sheets.

Referring to FIG. 2, each of the furring strips 28 includes a set of vertically spaced recesses or channels 29 which face the inner facing 20 and preferably have a depth of approximately 0.5 inch. As illustrated in FIG. 1, the channels 29 provide for conveniently installing electrical wiring, for example, flexible cables 32 and 33 which connect an electrical receptacle or outlet 34 and a control switch 36 to an electrical power source. It is apparent from FIG. 1 that the electrical outlets 34 and control switch 36 may be secured directly to the inner sheeting or facing 20 of to the furring strips 28.

As illustrated in FIG. 3, an exterior wall of the building structure is formed by positioning a wall panel assembly 10 on a wood sill 42 which is anchored to a top surface of a supporting foundation such as a concrete block footer or a poured concrete footer or floor 45 or a wood subfloor. Preferably, the sill 42 consists of a "2 × 4" which provides for anchoring the wood bottom plate 14 by the use of nails extending though inclined predrilled holes within the bottom plate 14 and through the depending flange 26. After all of the peripherally extending panel assemblies 10 of a buidling structure are erected on the corresponding bottom sills 42 to form the exterior load bearing walls of the structure, a series of roof trusses (not shown) are erected in parallel spaced relation on the top plates 12 of two opposing side wall panel assemblies 10, and conventional roof sheeting is attached to the trusses. Conventional roofing materials may then be secured to the roof sheeting to form a completely enclosed dwelling or building structure.

After the exterior wall panel assemblies 10 are erected and are covered by the roof structure, the desired window openings 48 and doorway openings 52 may be cut within the wall panel assemblies 10 so that the upper edge of the openings is located at or below the continuous horizontal head or flange plate 16, as illustrated in FIG. 3. Since the box beam 25 extends continuously the full length of each exterior wall panel assembly 10, the window openings 48 and doorway openings 52 may be formed at any desired locations and may be of substantial width, for example, 6 to 8 feet, without affecting or limiting the load bearing capacity of the wall panel assembly over the opening to carry normally imposed second floor and roof loads. For example, it has been determined that the integral box beam 25 provides the wall panel assembly 10 with a load bearing capacity of substantially greater than 600 pounds per linear foot of top plate 12 over a window or doorway opening of approximately 8 feet in width. This load bearing capacity of the wall assembly over an opening results from the fact that the integral beam 25 distributes the load supported over an opening into the adjacent wall panel portions on opposite sides of each opening. The substantial strength provided by the wall panel assembly 10 including the integral beam 25 is more than sufficient to meet performance codes for load bearing walls in single and multiple family dwelling units.

Referring again to FIG. 2, after the exterior wall panel assemblies 10 are erected and the window and doorway openings are cut, a series of wood frame members 54 are attached to the inner sheeting 20 around each of the window openings 48 and doorway openings 52 to form a spacer having a thickness equal to the thickness of the furring strips 28. Preferably, the frame members 54 are formed by sections of "2 × 2" in the same manner as the furring strips 28, but frame members 54 may be attached to the inner sheeting 20 by suitable nails instead of adhesive as used to bond the furring strips 28.

After the spacing strips or frame members 54 are attached and the framework for the interior walls of the building structure is completed along with the electrical wiring and plumbing, sheets 58 of gypsum board or "dry wall" are attached to the furring strips 28 by suitable nails or screws. The sheets 58 thus cooperate with the inner sheeting or facing 20 to form a dead air space. If additional thermal insulation is desired for the exterior walls of the building structure, above and beyond the substantial insulation provided by the expanded foam plastics core 22, battens of fiber glass insulation may be installed between the furring strips 28 for filling the dead air space between the inner sheeting or facing 20 and the drywall sheeting 58, or foil-backed dry wall sheeting may be used.

Referring to FIG. 4 which illustrates a modification of an exterior wall panel assembly constructed in accordance with the invention for a two story building structure, the first floor exterior wall panel assembly 70 is constructed identical to the wall panel assembly 10 described above in connection with FIGS. 1-3 with the exception that the continuous longitudinally extending header or flange plate 16 has been omitted. However, since the remaining components of the wall panel assembly 70 are the same as the wall panel assembly 10, common reference numbers are used to identify the corresponding components.

A second wood sill plate 72 is secured to the top plate 12 of the lower panel assembly 70, and a second floor exterior wall panel assembly 80 is erected on the sill plate 72. A series of wall panels 80 extend around the entire periphery of the building structure in the same manner as the wall panel assemblies 10 described above and are constructed substantially the same as the wall panel assembly 10 so that common reference numbers are used to identify common components. The primary difference of each wall panel assembly 80 is that it also includes a lower continuous flange plate 16' which extends the full length of the panel assembly 80 along with the upper flange or header plate 16.

The lower flange plate 16' cooperates with the bottom plate 14 of the wall panel assembly 80 and the outer and inner sheetings or facings 18 and 20 to form an integral box beam 25' which extends the full length of the exterior wall panel assembly 80. The lower box beam 25' adds vertical strength to the lower longitudinal portion of the wall panel assembly 80 and cooperates with the load bearing strength of the lower wall panel assembly 70 to support a series of parallel spaced second floor joist 82, particularly when a large window opening is cut within the upper panel assembly 80. The outer end portion of each joist 82 is supported by a metal hanger bracket 84 which is secured to a horizontal wood ledger plate 86. The plate 86 rests upon the upper ends of the furring strips 28 within the lower wall panel assembly 70 and is rigidly secured to the sill 72 and the bottom plate 14 of the upper wall panel assembly 80.

It is also apparent that the ends of the second floor joist 82 may be mounted directly on either the top plate 12 of a lower wall panel assembly 10 or directly on a sill plate 72 mounted on the top plate 12 of a wall panel assembly 10. In such a construction, a series of second floor exterior wall panel assemblies 10 or 80 may be installed on another sill plate 42 mounted on the upper surfaces of the floor joist 82. Small panels of expanded foam insulation would be inserted between the ends of the joist 82 to avoid a significant interruption in the high insulation value of the exterior walls of the building structure.

Another modification of an exterior wall panel assembly constructed in accordance with the invention is illustrated in FIGS. 5 and 6. In this embodiment, an exterior wall panel assembly 90 includes continuous core panels 22' of expanded plastics foam material which are sandwiched between and adhesively bonded to outer and inner facings 18 and 20 of rigid sheet material such as plywood or particle board, as mentioned above. In this embodiment, the upper header or flange plate 16 is omitted, but a continuous top plate 12 and a continuous bottom plate 14 are adhesively bonded along with the core panels 22' to the inner and outer facing sheets 18 and 20.

In place of the continuous integral box beam 25, the wall panel assembly 90 incorporates an integral "C-shaped" beam 95. The integral beam 95 is formed by an upper horizontal continuous beam or flange member 96 and a lower horizontal continuous beam or member 98 which are adhesively bonded to the inner facing 20 of sheet material and extend the full length of the wall panel assembly 90 along its upper portion.

A series of parallel spaced wood furring strips 102 are constructed substantially the same as the furring strips 28 and are adhesively bonded to the inner facing 20 at longitudinally spaced intervals. The furring strips 102 extend from the lower beam member 98 to the bottom edge of the inner sheeting 20 and serve the same function as the furring strips 28, as described above. The thickness of the beam members 96 and 98 is the same as the thickness of the furring strips 102 so that commonly available wood members such as "2 × 4" may be used to form the "C-shaped" beam 95 which also has a vertical height substantially greater than its horizontal thickness.

It is apparent that the strength of the beam 95 and its resistance to bending when supporting a load along the top plate 12, is less than the supporting strength of the box beam 25. However, in the construction of many building structures, the high load bearing strength of a continuous box beam 25 is not necessary and the lower load bearing strength of the beam 95 is sufficient, especially if large window or doorway openings are not used.

As apparent from the drawings and the above description, a wall panel assembly constructed in accordance with the present invention, provides a number of desirable features and advantages. For example, each of the wall panel assemblies illustrated in the drawings is adapted to be constructed on a high volume production basis and does not require customizing with window and doorway openings at predetermined locations. As a result, the panel assemblies can be produced on a highly efficient basis thereby minimizing the cost of a panel assembly.

As another feature, each of the rectangular panel assemblies can be constructed with substantial horizontal length relative to its vertical height so that an entire wall of a building structure may be produced as a single unit, thereby minimizing the time required for erecting a building structure. The continuous integral beam 25 or 95 also enables each panel assembly to be erected without forming the window and doorway openings so that the building structure may be enclosed and weather tight within a minimum time period.

The continuous beam also permits the selection of locations for window and doorway openings after the exterior walls of the building structure are erected. An enclosed structure without window openings also permits immediate heating of the building structure during the framing of the interior walls and while plumbing and electrical wiring are being installed. This feature is particularly desirable when a building structure is erected prior to the arrival of the window units and also permits a contractor to store equipment and materials within the structure as soon as the structure is enclosed. It is also apparent that a wall panel assembly of the invention may be manufactured in long lengths and then subsequently cut into shorter length panels according to the exterior configuration of the building structure.

As another important feature, the high strength and insulation properties of the sandwiched foam core panels cooperate with the parallel spaced furring strips 28 or 102 to simplify the installation of electrical wiring prior to the installation of the gypsum board or drywall. The furring strips also cooperate to define a dead air space between the inner sheeting or facing 20 and the drywall sheeting 58 to minimize sound transfer through each exterior wall panel assembly in addition to providing the sandwiched foam core panel with additional strength against bowing or buckling when the panel assembly is loaded. The sandwiched foam core panel structure also cooperates with the furring strips 28 to provide the panel assembly with a standard overall thickness, for example 4½ inches including the ½ inch drywall sheeting 58, for accommodating standard window frames and door jambs. While the panel assemblies are illustrated with identical facing sheets on opposite sides of the foam core panels, it is to be understood that the outer sheeting or facing 18 may be exposed siding of plywood or other material when it is desired to eliminate the cost of an outer facing of brick, lap siding or some other modular prefinished material.

While the forms of panel assemblies and methods herein described constitute preferred embodiments of the invention, it is to be understood that the invention is not limited to these precise forms and methods, and that changes may be made therein without departing from the scope and spirit of the invention as defined in the appended claims.

The invention having thus been described, the following is claimed:

1. A composite wall panel assembly adapted to simplify the construction of a building structure, comprising an inner facing of wood sheet material and an outer facing of wood sheet material disposed in parallel spaced relation, each said facing extending substantially continuously from the top of the wall panel assembly to the bottom of the assembly, a core of substantially rigid foam insulation material disposed between and contacting said inner and outer facings, a layer of adhesive bonding substantially the entire contacting surface of each said facing to the corresponding side of said core to form a laminated wall unit having a horizontal length greater than its vertical height, a plurality of horizontally spaced vertical wood furring strips positioned adjacent said inner facing and projecting inwardly towards the interior of the building structure, a layer of adhesive rigidly bonding substantially the entire contacting surface of each said furring strip to said inner facing, and said furring strips being adapted to receive inner sheeting material to form an interior wall surface for the building structure.

2. A wall panel assembly as defined in claim 1 and including means defining a window or doorway opening within said wall unit, at least one frame member disposed inwardly of said inner facing adjacent said opening, and said frame member has a thickness substantially the same as the thickness of said furring strips.

3. A wall panel assembly as defined in claim 1 wherein said furring strips project from said inner facing approximately 1.5 inches.

4. A composite wall panel assembly adapted to simplify the construction of a building structure, comprising an inner facing of wood sheet material and an outer facing of wood sheet material disposed in parallel spaced relation, each said facing extending substantially continuously from the top of the wall panel assembly to the bottom of the assembly, a core of substantially rigid foam insulation material disposed between and contacting said inner and outer facings, a layer of adhesive bonding substantially the entire contacting surface of each said facing to the corresponding side of said core to form a laminated wall unit having a horizontal length greater than its vertical height, a plurality of horizontally spaced vertical wood furring strips positioned adjacent said inner facing and projecting inwardly towards the interior of the building structure, a layer of adhesive rigidly bonding substantially the entire contacting surface of each said furring strip to said inner facing, said furring strips being adapted to receive inner sheeting material to form an interior wall surface for the building structure, means defining at least one channel within each of said furring strips and extending inwardly from the surface contacting said inner facing, and said channels cooperate with said inner facing to define corresponding passages for installing electrical wiring along said inner facing.

5. A composite wall panel assembly adapted to simplify the construction of a building structure, comprising an inner facing of wood sheet material and an outer facing of wood sheet material disposed in parallel spaced relation, each said facing extending substantially continuously from the top of the wall panel assembly to the bottom of the assembly, a core of substantially rigid foam insulation material disposed between and contacting said inner and outer facings, a layer of adhesive bonding substantially the entire contacting surface of each said facing to the corresponding side of said core to form a laminated wall unit having a horizontal length greater than its vertical height, a plurality of horizontally spaced vertical wood furring strips positioned adjacent said inner facing and projecting inwardly towards the interior of the building structure, a layer of adhesive rigidly bonding substantially the entire contacting surface of each said furring strip to said inner facing, said furring strips being adapted to receive inner sheeting material to form an interior wall surface for the building structure, a horizontal beam member disposed between said inner and outer facings at an elevation adjacent the top of a door or window opening formed within said wall unit, said beam member extending from substantially one end of the wall unit to the opposite end, and a layer of adhesive bonding said beam member to said inner facing for transferring a load supported by said wall panel assembly through said inner facing to the bottom of the assembly.

\* \* \* \* \*